US007086391B2

(12) United States Patent
Moulin et al.

(10) Patent No.: US 7,086,391 B2
(45) Date of Patent: Aug. 8, 2006

(54) METHOD OF ESTIMATING THE FUEL/AIR RATIO IN A CYLINDER OF AN INTERNAL-COMBUSTION ENGINE

(75) Inventors: Philippe Moulin, Paris (FR); Gilles Corde, Bois-Colombes (FR); Michel Castagne, Nanterre (FR); Grégory Rousseau, Clichy (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 11/072,304

(22) Filed: Mar. 7, 2005

(65) Prior Publication Data

US 2005/0211233 A1 Sep. 29, 2005

(30) Foreign Application Priority Data

Mar. 5, 2004 (FR) .................................. 04 02323

(51) Int. Cl.
*F02D 41/14* (2006.01)
*B60T 7/12* (2006.01)

(52) U.S. Cl. ...................................... 123/673; 73/23.32

(58) Field of Classification Search ................ 123/673, 123/672, 679; 701/103, 104, 105, 109; 73/23.32; 60/276, 285

See application file for complete search history.

(56) References Cited

U.S. PATENT DOCUMENTS

| | | | | | |
|---|---|---|---|---|---|
| 5,569,847 | A * | 10/1996 | Hasegawa et al. | ......... | 73/117.3 |
| 5,657,737 | A * | 8/1997 | Ishida et al. | ................ | 123/674 |
| 6,029,641 | A * | 2/2000 | Suzuki et al. | ............... | 123/673 |
| 6,041,279 | A * | 3/2000 | Maki et al. | ................. | 701/104 |
| 6,357,429 | B1 * | 3/2002 | Carnevale et al. | .......... | 123/673 |
| 6,823,253 | B1 * | 11/2004 | Brunell | ....................... | 701/100 |
| 6,827,061 | B1 * | 12/2004 | Nytomt et al. | ......... | 123/406.27 |
| 6,830,042 | B1 * | 12/2004 | Ikemoto | ..................... | 123/673 |
| 6,840,036 | B1 * | 1/2005 | Fiengo et al. | ................. | 60/285 |
| 2005/0121010 | A1 * | 6/2005 | Kita et al. | .................. | 123/673 |
| 2005/0161033 | A1 * | 7/2005 | Okamoto et al. | ........... | 123/673 |

FOREIGN PATENT DOCUMENTS

| | | | |
|---|---|---|---|
| FR | 2 834 314 | | 8/1978 |
| FR | 198 34 548 A1 | | 7/1998 |
| FR | 2 833 648 | | 6/2003 |
| JP | 2005-248962 | * | 9/2005 |

* cited by examiner

*Primary Examiner*—Hai Huynh
(74) *Attorney, Agent, or Firm*—Antonelli, Terry, Stout and Kraus, LLP.

(57) ABSTRACT

The present invention relates to a method of estimating the fuel/air ratio in each cylinder of a multicylinder internal-combustion engine comprising an exhaust circuit in which a single detector measures the fuel/air ratio of the exhaust gas. The estimator comprises a physical model (RTM) representing the expulsion of the gases from the cylinders and the travel thereof in the exhaust circuit to the detector, the model being coupled with a non-linear state observer of Extended Kalman Filter (KF) type.

16 Claims, 8 Drawing Sheets

METHOD OF ESTIMATING THE FUEL/AIR RATIO IN A CYLINDER OF AN INTERNAL-COMBUSTION ENGINE

BACKGROUND OF THE INVENTION

1. Field of the Invention

The present invention relates to a method of estimating the fuel/air ratio for each cylinder of an internal-combustion engine, in particular an injection engine.

2. Description of the Prior Art

Knowledge of the fuel/air ratio, characterized by the mass of fuel to the mass of air, is important for all vehicles, whether equipped with gasoline or diesel engines. In the case of a gasoline engine, the fuel/air ratio influences the nature of the emissions. A slightly rich mixture creates an increase in the CO and HC emissions, whereas a slightly lean mixture increases the NOx emissions. It is therefore of great importance to precisely control the fuel/air mixture cylinder by cylinder in this type of engine running with a total engine fuel/air mixture (average of the 4 cylinders) around stoichiometry so as to limit the emissions. In the case of conventional diesel engines or of gasoline engines running under stratified combustion conditions, combustion generally takes place with a lean mixture (fuel/air ratio below 1) and it is less sensitive to a precise fuel/air ratio adjustment. Depollution by deNox catalysis of this type of engine however requires temporary maintenance, for some seconds, of a slightly rich mixture in order to bleed the NOx trap, prior to coming back to normal running conditions with a lean mixture. Depollution by deNox catalysis therefore requires precise control of the fuel/air ratio cylinder by cylinder in order to guarantee the required fuel/air level during this stage. Finally, engines running according to new combustion types, in particular HCCI diesel engines, among which the NADI™ concept developed by the assignee can be rated, work with very high recycled burnt gas ratios and therefore confined fuel/air ratios, which also make them very sensitive to a precise adjustment of the fuel/air ratio of each cylinder.

In order to control more precisely, and in particular individually, injection of the fuel masses into the cylinders, reconstruction of the fuel/air ratio in each cylinder is necessary. Since installing fuel/air ratio probes at the outlet of each cylinder of a vehicle cannot be done considering their cost price, setting an estimator working from measurements provided by a single proportional probe placed in the common part of the exhaust advantageously allows separately knowing the fuel/air ratio of each cylinder. An engine control can thus, from the reconstructed fuel/air ratios, adjust the fuel masses injected into each cylinder so that the fuel/air ratios are balanced in all the cylinders.

In the description hereafter, the invention is illustrated by the example of a supercharged diesel engine equipped with a NOx trap, where the probe can be placed at the turbine outlet and upstream from the NOx trap. The measurement provided by this probe is used for total engine control of the mass injected into the cylinders during the rich phases, each cylinder receiving then the same mass of fuel. The present invention however applies to all engine types having one or more proportional probes downstream from the junction of several cylinders.

French Patent 2,834,314 describes a model achieved, then observed and filtered by means of the Kalman filter. This model contains no physical description of the mixture in the manifold and does not take into account of the highly pulsating flow rate phenomena.

Estimation of the fuel/air ratio is only conditioned by the coefficients of a matrix, coefficients which have to be identified off-line by means of an optimization algorithm. Furthermore, a different adjustment of the matrix, therefore an identification of its parameters, corresponds to each working point (engine speed/load). This estimator thus requires substantial acquisition testing apparatus (with 5 fuel/air ratio probes) and is not robust in case of engine change.

SUMMARY OF THE INVENTION

The object of the present invention is to allow finer modelling of the exhaust process so as to, on the one hand, do without the identification stage and, on the other hand, provide the fuel/air ratio estimation model with more robustness, for all the engine working points.

The present invention thus relates to a method of estimating the fuel/air ratio in each cylinder of a multicylinder combustion engine comprising an exhaust circuit including at least pipes connecting the exhaust of the cylinders to a manifold and a fuel/air ratio detector downstream from the manifold. The method comprises the following steps:

establishing a physical model (RTM) representing in real time the expulsion of the gases from the cylinders and their travel in the exhaust circuit to the detector, coupling the model with a non-linear state observer of an Extended Kalman Filter type wherein the fuel/air ratio measurement provided by the detector is taken into account, and deducing the fuel/air ratio value at the exhaust circuit inlet.

The development of a different formalism (no circular permutation of the state vector) will furthermore allow measurements every 6° of crankshaft rotation, and therefore to be less disturbed by the noise.

According to the invention, the fuel/air ratio value at the exhaust circuit inlet can be assigned to a particular cylinder.

A lag time due to the gas transit time and to the detector response time can be evaluated by generating a test disturbance in a determined cylinder and by measuring its effect by means of the detector.

The physical model (RTM) can be validated by means of a non-invertible reference modelling.

The invention can be applied to an engine control for adapting the fuel masses injected into each cylinder in order to adjust the fuel/air ratios in the cylinders.

BRIEF DESCRIPTION OF THE FIGURES

Other features and advantages of the present invention will be clear from reading the description hereafter of an on-limitative embodiment example, illustrated by the accompanying figures, wherein.

DETAILED DESCRIPTION OF THE INVENTION

The advantages of a fuel/air ratio estimation in each cylinder individually are numerous in relation to an average fuel/air ratio estimation for all of the cylinders:

- cost price gain if the estimation is performed from a single fuel/air ratio probe at the turbine outlet,
- emissions reduction by finer fuel/air ratio adjustment in each cylinder,
- improved driveability (delivered torque regulation),
- fuel consumption reduction through cylinder harmonization,
- injection system diagnosis (detection and compensation of the drift of a cylinder or of the failure of the injection system),
- correction of the air and/or burnt gas filling disparities.

Description of the Exhaust Process

Figure 1:
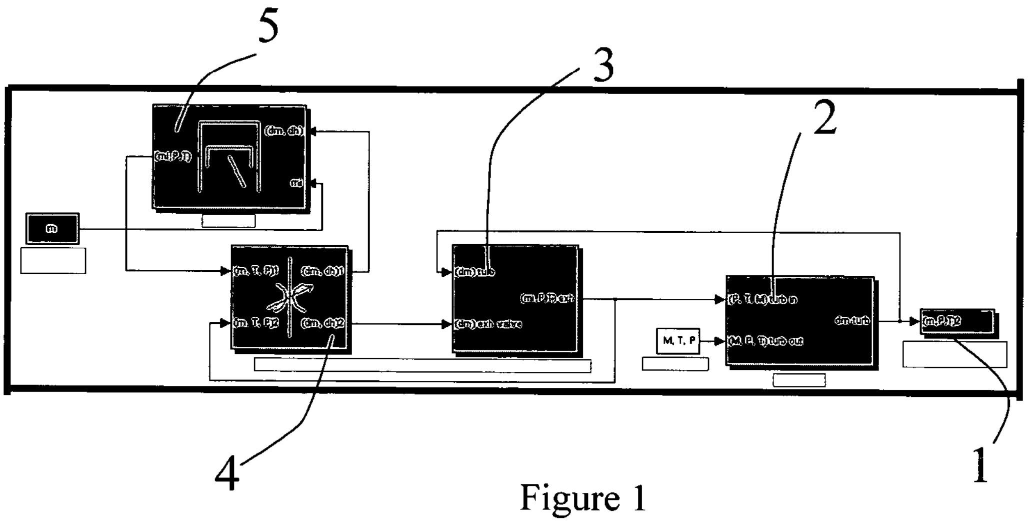
FIG. 1 diagrammatically illustrates the physical model representing the exhaust process.

The exhaust process comprises the path travelled by the gases from the exhaust valve to the atmosphere, at the exhaust muffler outlet. The engine in the present embodiment example is a 2000-$cm^3$ 4-cylinder engine. It is equipped with a turbo or supercharger whose action can be controlled by actuating a wastegate type discharge valve. An EGR (exhaust gas recirculation) circuit is also present in this engine, the valve being arranged upstream from the turbine. The diagram of FIG. 1 shows the descriptive elements of the exhaust process.

Fuel/air ratio probe 1 is arranged just after turbine 2. The gases, after combustion in cylinder 3, undergo the following actions passage through exhaust valve 4. The latter being controlled by a camshaft with the lift law being bell-shaped. The flow rates will go from a high value, when the valve opens, to a lower value when the cylinder and manifold pressures become equal, and they will eventually increase again when the piston starts upward movement again to expel the exhaust gases, passage through a short pipe connecting the manifold to the cylinder head outlet, mixing phase in exhaust manifold 5 where the flows of the four cylinders meet. It is here that the expelled exhaust mix, depending on the manifold type (symmetrical or asymmetrical), on the EEO (Early Exhaust Opening) and on the LEC (Late Exhaust Closing) which will determine the flow overlap proportion, passage through the turbine which supplies the compressor arranged upstream from the intake with the required torque. Although its action on the flow rates is not well known, one may consider that it is going to mix even more the expelled exhaust coming from the various cylinders, measurement by the UEGO type probe.

The composition of the exhaust gases depends on the amounts of fuel and of air fed into the combustion chamber, on the composition of the fuel and on the development of the combustion.

In practice, the fuel/air ratio probe measures the $O_2$ concentration inside a diffusion chamber connected to the exhaust pipe by a diffusion barrier made of a porous material. This configuration can induce differences depending on the location of the probe selected, notably because of the temperature and/or pressure variations near the fuel/air ratio probe.

This fuel/air ratio variation phenomenon depending on the pressure or on the temperature has however been disregarded since what is sought is the detection of fuel/air ratio disparities between the cylinders, the mean value being normally kept by the estimator.

In the model of the estimator according to the invention, it is chosen to relate the measured fuel/air ratio to the air mass (or air flow rate) around the probe, in relation to the total mass (or total flow rate). The model is based on a three-gas approach: air, fuel and burnt gases. One thus considers that, with a lean mixture, all of the gas remaining after combustion is a mixture of air and of burnt gases. For a rich mixture, the fuel being in excess, unburnt fuel and burnt gases are present after the combustion, whereas all of the air has disappeared. In reality, the combustion is never 100% complete, but the estimator considers it to be complete.

In order to define a formulation relating the fuel/air ratio to the three types mentioned above, the mass of each of the three gases is considered as follows, as well as their percentage by mass, before and after combustion:

air: x fuel: y burnt gas: z.

In the case of a lean mixture: the air is in excess, and no fuel is left after combustion. Before combustion, the following masses are assumed to be present in the cylinder:

$M_{air}=X;\ M_{carb}=y;\ M_{GazB}=0$

Knowing that a ratio of 14.7 times as much air to fuel is required to reach stoichiometric conditions with the fuel used, the table hereunder give the mass of each type before and after combustion can be drawn up:

| | Air mass | Fuel mass | Burnt gas mass |
|---|---|---|---|
| Before combustion | x | y | 0 |
| After combustion | x − 14, 7 × y | 0 | y + 14, 7 × y |

With the fuel/air ratio λ representing the (fuel mass)/(air mass) ratio, after calculation the following formulation, valid only if the mixture is lean is obtained:

$$\lambda = \frac{m_{gazB} \cdot PCO}{m_{air} \cdot (1 + PCO) + m_{gazB} \cdot PCO}$$

For a rich mixture, the formula is as follows:

$$\lambda = \frac{m_{carb}(1 + PCO)}{m_{gazB}} + 1$$

PCO corresponds to the ratio of the air mass to the fuel mass when the mixture is stoichiometric.

However, these formulas are valid in the case where the mixture contains no EGR since the presence of burnt gases at the intake will change the concentrations of the three gases at the exhaust.

In the present embodiment, only the fuel/air ratio formula for lean mixtures is used in the estimator. However, the invention is not limited to this embodiment; in fact, the formula is continuous in the vicinity of air fuel/air ratio 1, and its inversion poses no problems for rich mixtures.

In order to better apprehend the way the gases mix in the exhaust pipes, a diesel engine model was used with the AMESim software of the IMAGINE Company of France whose Engine library is developed in collaboration with the assignee. This model, which cannot be inverted, will be used as a reference to validate the model according to the invention.

AMESim is a OD modelling software, particularly well-suited for thermal and hydraulic phenomena. It notably allows modeling of volumes, pipes and restrictions.

The exhaust model comprises:

- the exhaust pipes represented by a volume and a tube,
- the exhaust manifold with thermal exchanges,
- the turbine and the bypass valve,
- a volume at the confluence of the turbine and valve flow rates,
- a tube between the turbine and the measuring probe, and
- a volume and a tube for the exhaust line.

The elementary parts for modelling the pipes, restrictions and volumes are described in the AMESim instruction manual "Thermal Pneumatic Library". Standard equations are used to calculate a flow rate through a restriction, the energy and mass conservation. Furthermore, the model accounts for the inertia of the gases, which is important in the study of gas composition dynamics.

Since it is a 0D model, dimension x is not taken into account, and it is not possible to model a lag time with a physical approach. If an input variable is changed, the output is immediately changed. The transport time is thus not considered. This limitation is important when attempting to work on real-time acquisitions.

Figure 2:
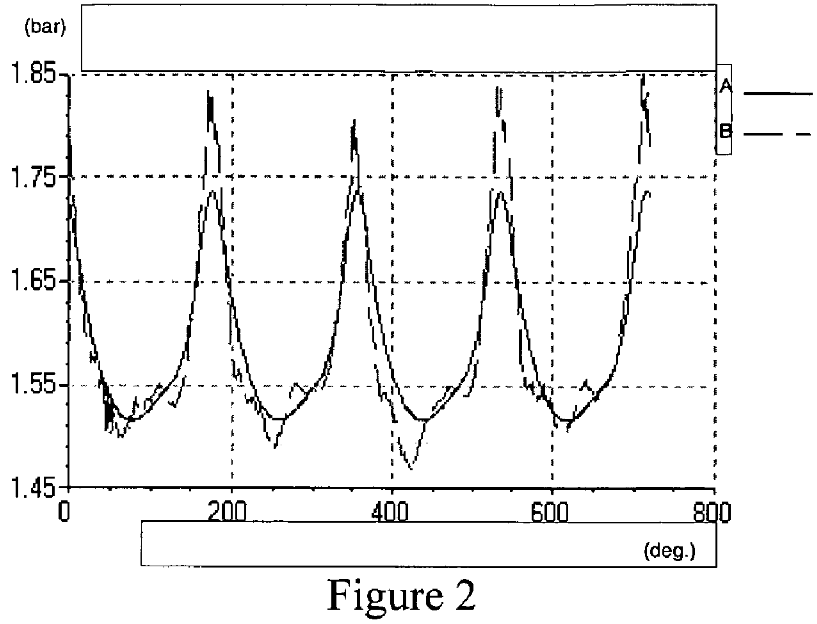
FIG. 2 shows the comparison between a reference model and the physical model according to the invention.

The reference model that was developed by comparison with measurements on test benches. FIG. 2 (ordinate: manifold pressure in bars, abscissa: crankshaft angle in degrees) shows the comparison between curve B representing the bench measurements with the result given by the AMESim model, curve A. It can be seen that the main dynamic phenomena are very well represented.

In order to obtain an estimator, the model has to be sufficiently simple to be inverted. Thus, only the important physical phenomena from the gas composition dynamics are represented. On the other hand, the estimator is intended to be implemented in an on-board engine control system, the input variables are limited to those conventionally available, that is: engine speed, intake pressure, injection time, λ probe measurement.

Real-Time Model

Figure 3:
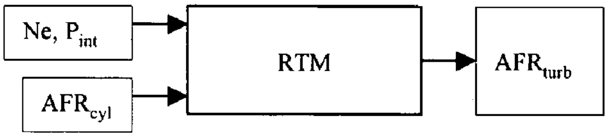
FIG. 3 shows the diagrammatic structure of the real-time model.

The real-time model RTM thus has the structure illustrated in FIG. 3, where $AFR_{turb}$ is the composition of the gases at the turbine outlet, $AFR_{cycl}$ the fuel/air ratio in each cylinder, $N_e$ the engine speed and $P_{int}$ the intake pressure.

In the present embodiment, the temperature variation is considered low over an engine cycle, and that its action is limited on the flow rate variations. The pressure variations are in fact essential in the process since they are directly related to the flow rates. A fixed temperature is thus set for each element cylinders, manifold and turbine. The heat exchanges are therefore not modelled either. This simplification hypothesis does not have much impact.

In a first approach, two gases are considered: fresh air and burnt gases. The conventional equations describe the evolution of the total mass of the gases in the volumes, and of the mass of fresh air. The burnt gases can then be deduced therefrom. This procedure is valid in the case of lean mixture conditions, but similar equations can be written for the fuel and the burnt gases, in the case of a rich mixture.

Gas Expulsion

For this model, the volume corresponds to that of a cylinder, the latter being continuously in translation motion. Thus, the volume depends on the crankshaft angle.

A restriction model uses the Barré Saint Venant equations to model the exhaust valve restriction.

For optimization reasons linked with the calculation time, the gas expulsion model of the cylinder and of the variable exhaust valve restriction is replaced by a neural network.

The latter allows the estimator to calculate the fuel/air ratios much faster, considering the low complexity of the neural network.

This network has 2 hidden layers and of 12 neurons per layer. It has 3 neurons in the input layer (engine speed, mass in the cylinder and crankshaft angle) and provides at the output the march of the flow rate at the exhaust valves outlet.

Figure 4:
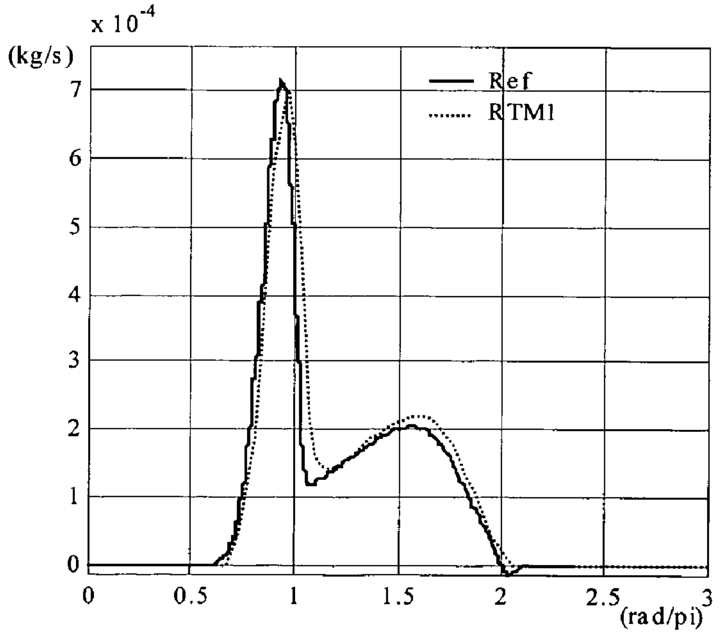
FIG. 4 illustrates the results of the gas expulsion model RTM1 in relation to a reference.

FIG. 4 illustrates the results of this model RTM1 in relation to a reference Ref.

$$W_{cyl}=f_{NN}(N_e,\ P_{int},\ \alpha_{crank}) \tag{1}$$

$W_{cyl}$: Total gas mass flow rate at cylinder outlet
$N_e$: Engine speed
$P_{int}$: Manifold inlet pressure
$\alpha_{crank}$: Crankshaft angle The composition of the gas is the same as in the cylinders. Therefore:

$$W_{cyl\_air}=W_{cyl}\times(1-AFR_{cly}) \tag{2}$$

$W_{cyl\_air}$: Fresh air mass flow rate at cylinder outlet

Exhaust Manifold

The exhaust manifold is modelled according to a volume in which there is mass conservation. The temperature is assumed to be substantially constant and determined from a chart as a function of the engine speed and load.

$$\begin{cases} \dot{M}_{man} = W_{cyl} - W_{turb} \\ \dot{M}_{\text{man\_air}} = W_{\text{cyl\_air}} - W_{\text{turb\_air}} \\ P_{man} = M_{man} \times \dfrac{R \times T_{man}}{V_{man}} \end{cases} \tag{3}$$

$M_{man}$: Gas mass at manifold outlet
$M_{man\_air}$: Fresh air mass at manifold outlet
$w_{turb}$: Mass flow rate through the turbine
$W_{turb\_air}$: Fresh air mass flow rate through the turbine
$P_{man}$: Manifold outlet pressure
$T_{man}$: Manifold outlet temperature
$V_{man}$: Manifold outlet volume
R: Perfect gas thermodynamic constant Turbine Model The turbine is modelled according to a flow rate restriction. The flow rate in the turbine is generally given by a chart, it is estimated by a third-order polynomial and corrected to take account of the inlet pressure and of the temperature. The coefficients of the polynomial are optimized by correlation with the turbine mapping.

$$W_{turb} = Poly_{turb}\left(\frac{P_{man}}{P_{exh}}\right) \times \frac{P_{man}}{\sqrt{T_{man}}} \times \frac{\sqrt{T_{ref}}}{P_{ref}} \tag{4}$$

$P_{exh}$: Exhaust outlet pressure
$T_{ref}$, $P_{ref}$: Turbine reference temperature and pressure The composition of the flow in the turbine is the same as at the manifold outlet, therefore:

$$W_{\text{turb\_air}} = W_{turb} \times \frac{M_{\text{man\_air}}}{M_{man}} \tag{5}$$

Figure 5:
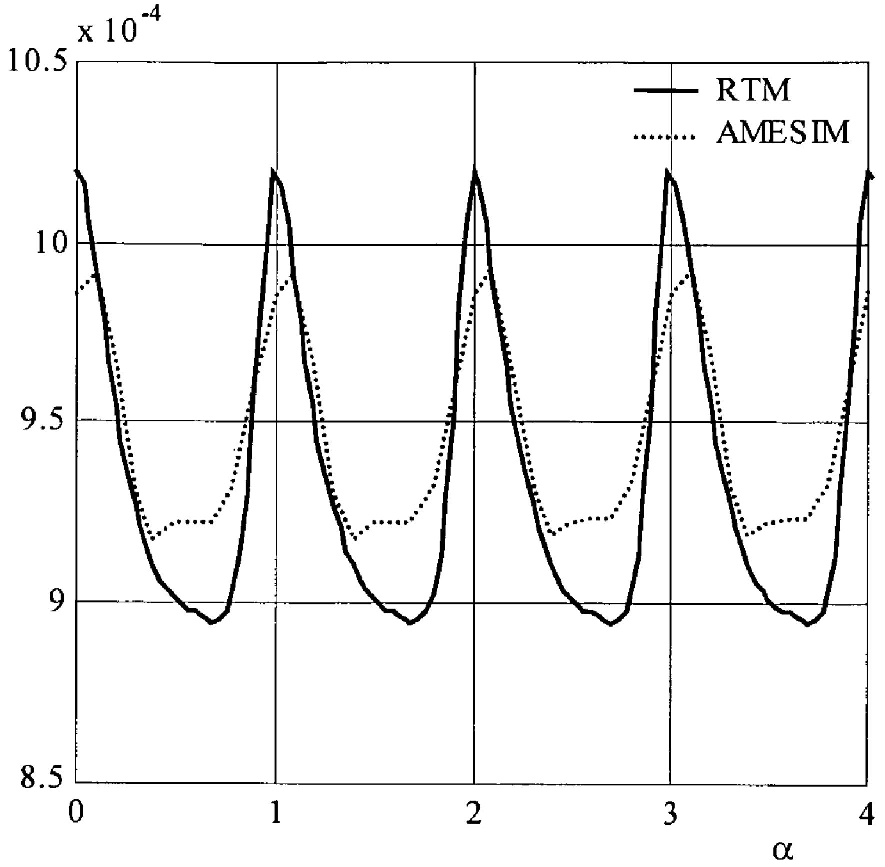
FIG. 5 shows the comparison between the reference model AMESim and the model according to the invention.

FIG. 5 shows the comparison between the aforementioned AMESim model and the model according to the invention obtained in Simulink. It can be noted that the dynamics is well represented and that the signals are indeed in phase.

Measuring Probe

The transfer function of the "UEGO" type measuring probe is modelled according to a first-order filter, and the fuel/air ratio (AFR) given by the model downstream from the turbine is equal to the fuel/air ratio in the manifold. Thus:

$$\dot{\lambda}_{meas} = \frac{1}{\tau}\left(1 - \frac{M_{\text{man\_air}}}{M_{man}} - \lambda_{meas}\right) \tag{6}$$

$\lambda_{meas}$: Relative fuel/air ratio measured downstream from the turbine $\lambda_{cyli}$: Relative fuel/air ratio in cylinder i $\tau$: Filter time constant (about 20 ms).

Exhaust Lag Time

The lag time due to the transport of the gas in the pipes and the various volumes, and to the "idle time" of the measuring probe, are not taken into account in the physical model described above. However, the model is constructed linearly in relation to these lag times. They can therefore be compiled into a single lag time for all of the exhaust process, and the model can be inverted as it is, since the influence of the lag time can be considered later, as explained hereafter.

Fuel/Air Ratio Estimator AFR

The above model describes that the fuel/air ratio downstream from the turbine is expressed as a function of the composition of the gas flow at the exhaust manifold inlet. Once inverted, this model therefore allows knowing the fuel/air ratio at the manifold inlet. After taking account of the dynamic effects of the exhaust, the fuel/air ratio at the cylinder outlet is obtained.

The estimator for estimating the individual fuel/air ratio per cylinder according to the invention mainly comprises two stages:

a first stage of inversion of the exhaust model, which leads to an estimation of the fuel/air ratio at the exhaust manifold inlet, and a second stage that identifies the right cylinder to which the fuel/air ratio estimation should be assigned.

Estimator Structure

In the previous equations, the fuel/air ratio measured at the detector is calculated from the fuel/air ratio in the cylinders, the flow of air at the cylinder outlet and the total flow of gas. This structure is difficult to use in a Kalman filter because the inputs of the model have to be estimated. The state system is therefore completed by addition of the inputs (Mohinder S. Grewal: "Kalman Filtering Theory and Practice", Prentice Hall, 1993).

From equations (2) to (6), the equation of state becomes:

$$X = \begin{bmatrix} M_{\text{man\_air}} \\ M_{man} \\ W_{\text{cyl\_air}} \\ W_{cyl} \\ \lambda_{mean} \end{bmatrix} \quad \dot{X} = \begin{cases} W_{\text{cyl\_air}} - f_{turb}(M_{man}) \times M_{\text{man\_air}} \\ W_{cyl} - f_{turb}(M_{man}) \times M_{man} \\ 0 \\ 0 \\ \frac{1}{\tau} \times \left(\frac{M_{man}}{M_{man} - M_{\text{man\_air}}} - \lambda_{meas}\right) \end{cases} \tag{7}$$

with:

$$f_{turb}(M_{man}) = Poly_{turb}\left(\frac{M_{man} \times R \times T_{man}}{V_{man} \times \sqrt{T_{man}} \times P_{exh}}\right) \times \frac{R \times T_{man}}{V_{man} \times \sqrt{T_{man}}} \times \frac{\sqrt{T_{ref}}}{P_{ref}} \tag{8}$$

The input measurement equations are:

$$Y = \begin{bmatrix} \lambda_{meas} \\ M_{man} \end{bmatrix} \tag{9}$$

This model is non linear, but is has a structure that can be used in an extended Kalman filter (Greg Welch and Gary Bishop: "An Introduction to the Kalman Filter", University of North Carolina—Chapel Hill TR95-041. May 23, 2003). The structure of an extended Kalman filter is discussed hereafter.

The extended Kalman filter (EKF) allows estimation of the state vector of a process in cases where the latter, or the measuring process, is non linear.

It is assumed that the process is governed by a non-linear stochastic equation:

$$x_k = f(x_{k-1}, u_k, w_{k-1})$$

The measurement is given by the non-linear observation equation $$y_k = h(x_k, v_k)$$

where the random variables $w_k$ and $v_k$ respectively represent the model noises and the measurement noises.

The prediction/correction algorithm is as follows:

Stage No. 1: Prediction $$\hat{x}^- = f(\hat{x}_{k-1}, u_k, 0)$$

$$P_k^- = A_k P_{k-1} A_k^T + W_k Q_{k-1} W_k^T$$

Stage No. 2: Correction $$K_k = P_k^- H_k^T (H_k P_k^- H_k^T + V_k R_k V_k^T)^{-1}$$

$$\hat{x}_k = \hat{x}_k^- + K_k(z_k - h(\hat{x}_k^-, 0))$$

$$P_k = (I - K_k H_k) P_k^-$$

where:

A is the Jacobian matrix of the partial derivatives of f with respect to x:

$$A_{[i,j]} = \frac{\partial f_{[i]}}{\partial x_{[j]}}(\hat{x}_k, u_k, 0)$$

W is the Jacobian matrix of the partial derivatives of f with respect to w:

$$W_{[i,j]} = \frac{\partial f_{[i]}}{\partial w_{[j]}}(\hat{x}_k, u_k, 0)$$

H is the Jacobian matrix of the partial derivatives of h with respect to x:

$$H_{[i,j]} = \frac{\partial h_{[i]}}{\partial x_{[j]}}(\hat{x}_k^-, 0)$$

V is the Jacobian matrix of the partial derivatives of h with respect to v:

$$V_{[i,j]} = \frac{\partial h_{[i]}}{\partial x_{[j]}}(\hat{x}_k^-, 0)$$

It can be noted that, to lessen the notations, the index of time interval k is not given, even though these matrices are in fact different at each interval.

At the input of the Kalman filter, the fuel/air ratio AFR downstream from the turbine and the total mass of gas in the manifold are necessary. The fuel/air ratio is measured, the total gas mass is the result of the calculation of the model in parallel with the Kalman filter.

The output of the Kalman filter is the state estimation from which the composition of the exhaust gas at the manifold inlet is obtained. This result then has to be assigned to the right cylinder.

Assignment Per Cylinder

The neural network used to model the gas mass flow rate at the cylinder outlet has been described above. If the dynamics of the gas in the pipes and the corresponding lag time are disregarded, the contribution of each cylinder to the mass flow rate of the exhaust gas at the manifold inlet can be determined by means of the ratio of the mass flow rate of a cylinder to the total mass flow rate. It is expressed by matrix C:

$$C=\lfloor V_{cyl1},\ W_{cyl2},\ W_{cyl3},\ W_{cyl2}\rfloor/W_{cyl} \qquad (10)$$

This matrix depends on the crankshaft angle and it is periodic. The sampling time of the algorithm is six degrees crankshaft angle. This frequency is high in order to have model calculation points for which a single exhaust valve is open. At this frequency, it is the case whatever the engine speed.

It is then considered that the composition of the exhaust gas at the manifold inlet only depends on the contributory cylinders. The composition of the gas in the cylinders is estimated using a standard discrete estimator structure:

$$\Lambda_k = \begin{bmatrix} \lambda_{cyl1} \\ \lambda_{cyl2} \\ \lambda_{cyl3} \\ \lambda_{cyl4} \end{bmatrix} \qquad (11)$$

$$\Lambda_{k+1}\Lambda_k+K_{alloc}\times C^t\times(\lambda_{man\_in\_k}-C\times\Lambda_k) \qquad (12)$$

$K_{alloc}$ is the gain of the estimator.

Figure 6:
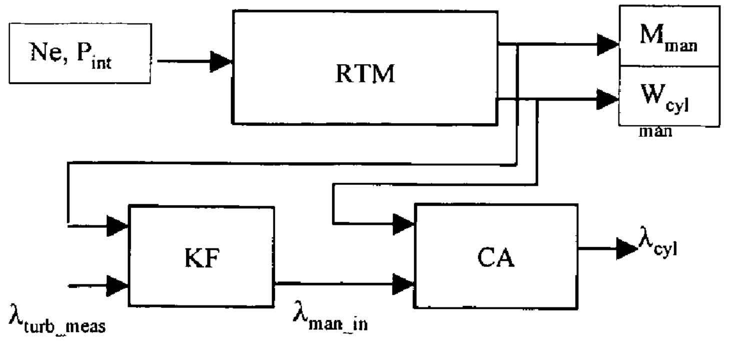
FIG. 6 shows the structure of the estimator.

The estimator according to the invention, which allows reconstruction of the fuel/air ratio in each cylinder from a single measurement downstream from the turbine, has the structure diagrammatically shown in FIG. 6.

the block identified RTM represents the physical model, block KF is the Kalman filter and block CA represents the module of assignment per cylinder.

Simulation Results

The estimator comprising the real-time physical model, the Kalman filter and the assignment module is tested. The fuel/air ratio measurements used at the estimator input are given by AMESim reference modelling. The dynamics of the probe has not been taken into account.

Figure 7A:
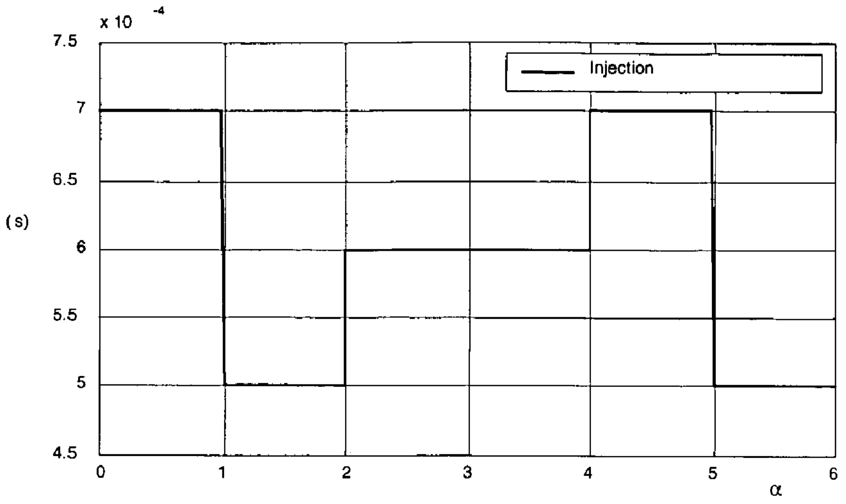
FIGS. 7*a*, 7*b*, 7*c* show the results of the estimator with the assignment module.
Figure 7B:
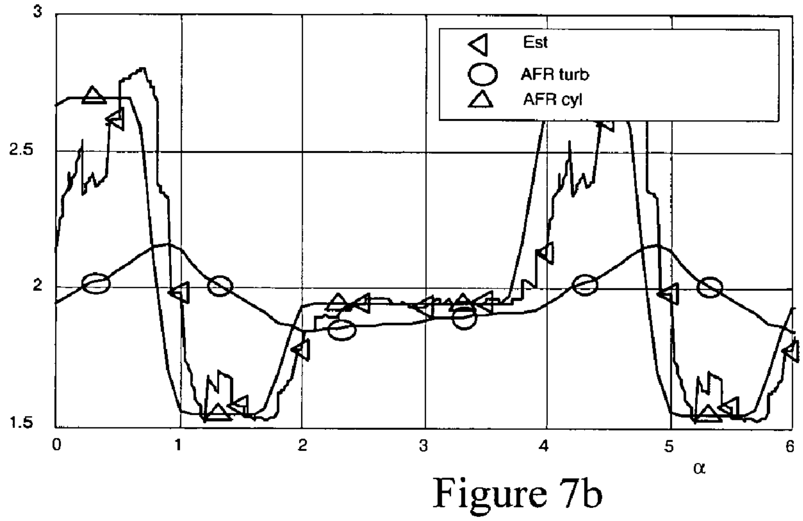

FIG. 7*a* shows the injection times as a function of the crankshaft adjustment applied to cylinders 1 and 2. FIG. 7*b* gives on the same graph: the fuel/air ratio downstream from the turbine ($AFR_{turb}$) and the comparison between the theoretical cylinder fuel/air ratio ($AFR_{cyl}$) and the cylinder fuel/air ratio (Est) estimated by the model of the present invention. A slight phase difference, probably due to the inertia of the gas that is not taken into account in the present model, can be noted. However, the performance of the Kalman filter for the inversion is good.

Figure 7C:
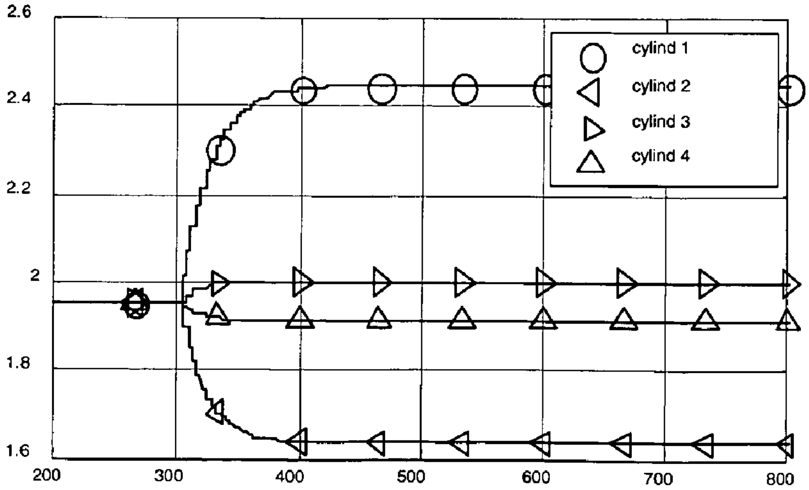

For the same signals, FIG. 7*c* shows the efficiency of the estimation and of the cylinder assignment module, although the fuel/air ratio values for cylinders 3 and 4 are slightly modified.

Exhaust Lag Time Estimator

The estimator implemented as described above does not take account of the lag time between the cylinder exhaust and the signal acquired by the probe. In reality, the lag time is due to several sources: transport time in the pipes and through the volumes, idle time of the measuring probe.

Figure 8:
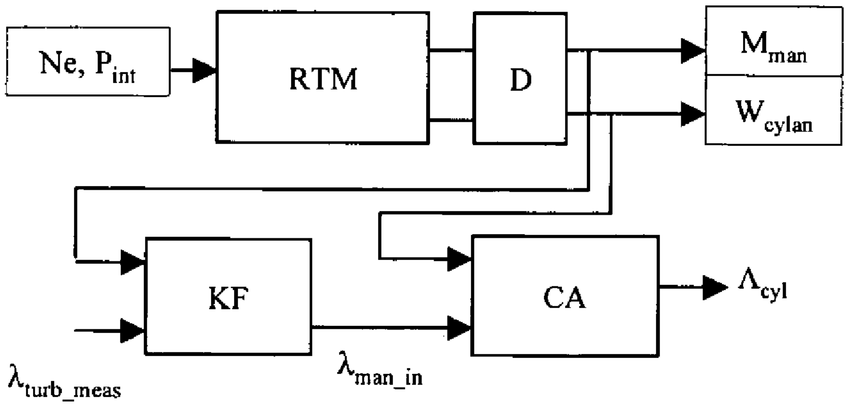
FIGS. 8 and 9 show the structure of the estimator comprising taking the lag time into account.

By applying a lag time D at the estimator input to the variables from the model, it can be synchronized with the fuel/air ratio measurements. FIG. 8 shows the structure of the estimator with lag time.

The lag time depends on the running conditions: engine speed, load, exhaust manifold pressure, etc. Since the delay is difficult to model, an identification method was developed to calculate in real time the lag time between the estimator and the measurements without using an additional instrument. The principle consists in applying a small increment in the neighbourhood of the injection point of cylinder 1, and in calculating the estimated fuel/air ratio variations for each cylinder. Then, an identification criterion $J_k$ is constructed so as to penalize the variations of cylinders 2, 3 and 4.

$$\begin{cases} \beta = [0, 1, -1, 2] \\ J_k = \beta \times (\Lambda_k - \Lambda_0) \end{cases} \qquad (13)$$

The penalization is given by β. If there is a positive variation of the fuel/air ratio value estimated for cylinder 2, the lag time between the estimator and the measurements is positive. If there is a variation on cylinder 3, the delay is negative and the penalization is negative. A variation of cylinder 4 can be considered to be a consequence of a positive or negative delay.

Figure 9:
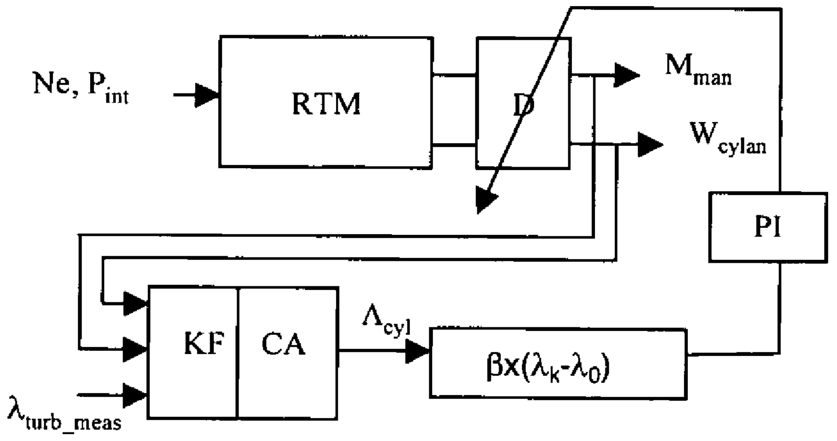

Criterion $J_k$ is controlled at zero by a controller PI on the estimator delay. When the controller is stabilized, the estimated fuel/air ratio variation is maximum on cylinder 1, and minimum on cylinder 4. The estimator is then in phase with the measurements. The identification principle is described in the diagram of FIG. 9.

Results

The next figures show the results of the estimator with a 10% lag of the injection time at cylinder 1, at medium load and at a speed of 2600 rpm.

Figure 10A:
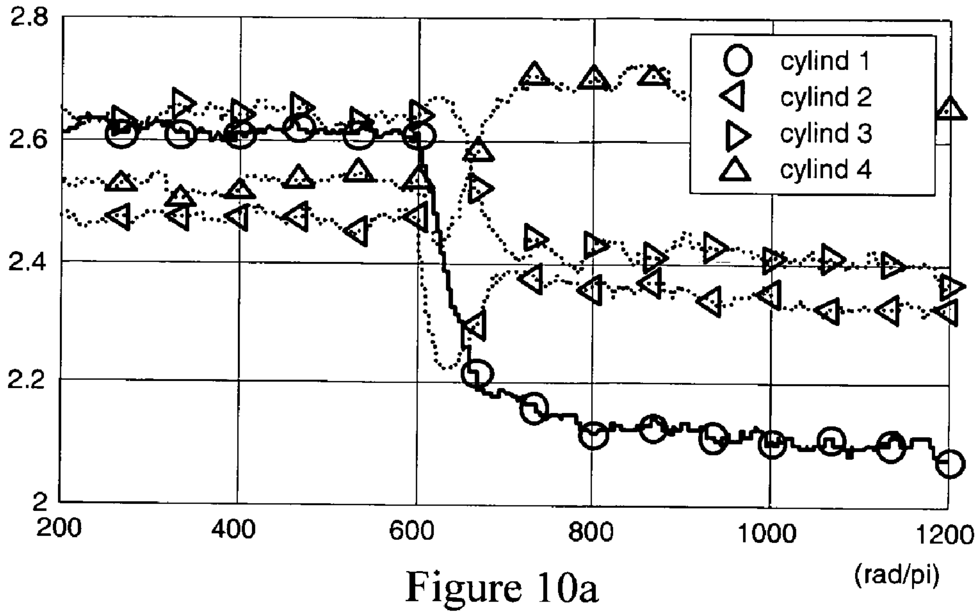
FIGS. 10*a*, 10*b* show the identification of the lag time.
Figure 10B:
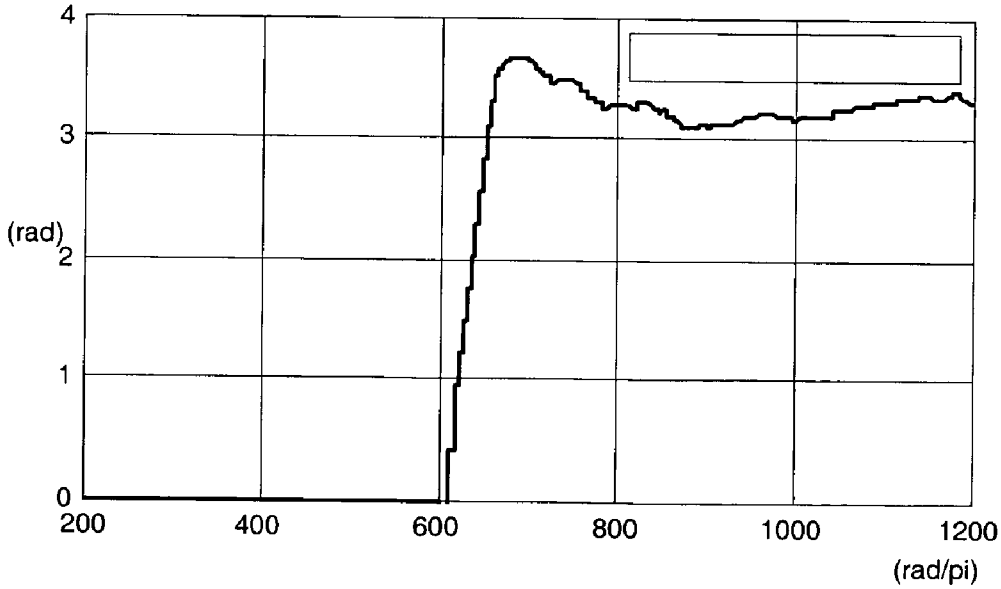

FIGS. 10_a_ and 10_b_ show the identification of the lag time between the estimator and the measurements. In case of an offset of the injection time of the nozzle of cylinder 1 (timing at about 600 rad/π—FIG. 11_b_), the variation of the estimated fuel/air ratio of cylinder 1 is lower than for the other cylinders. This is corrected by the regulator that is stabilized after 60 cycles.

Figure 11A:
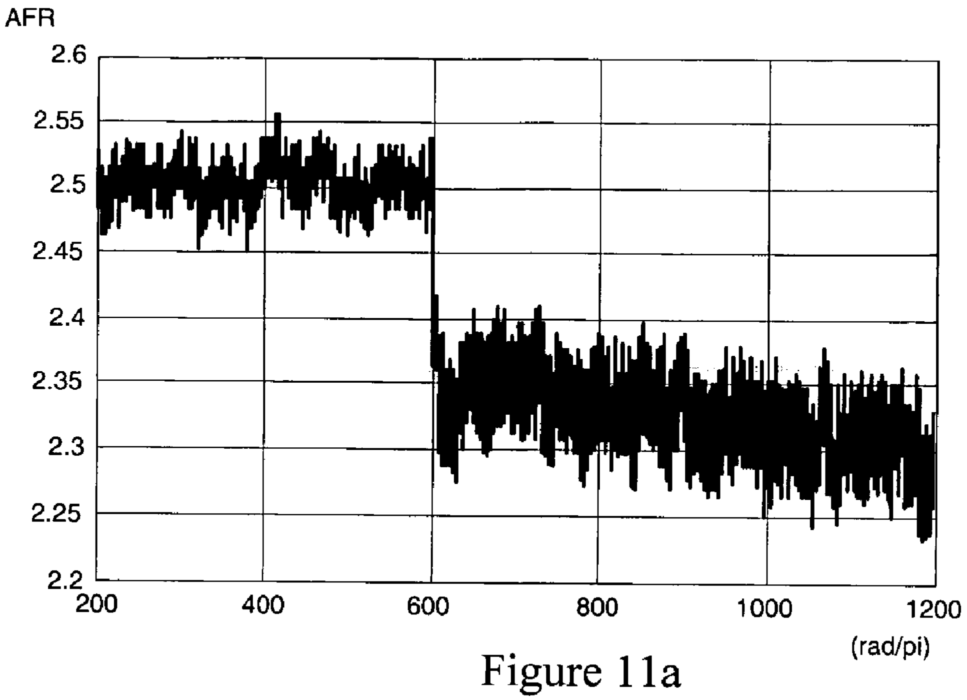
FIGS. 11*a*, 11*b*, 12*a*, 12*b* illustrate the results of the estimator according to the invention for two working points.
Figure 11B:
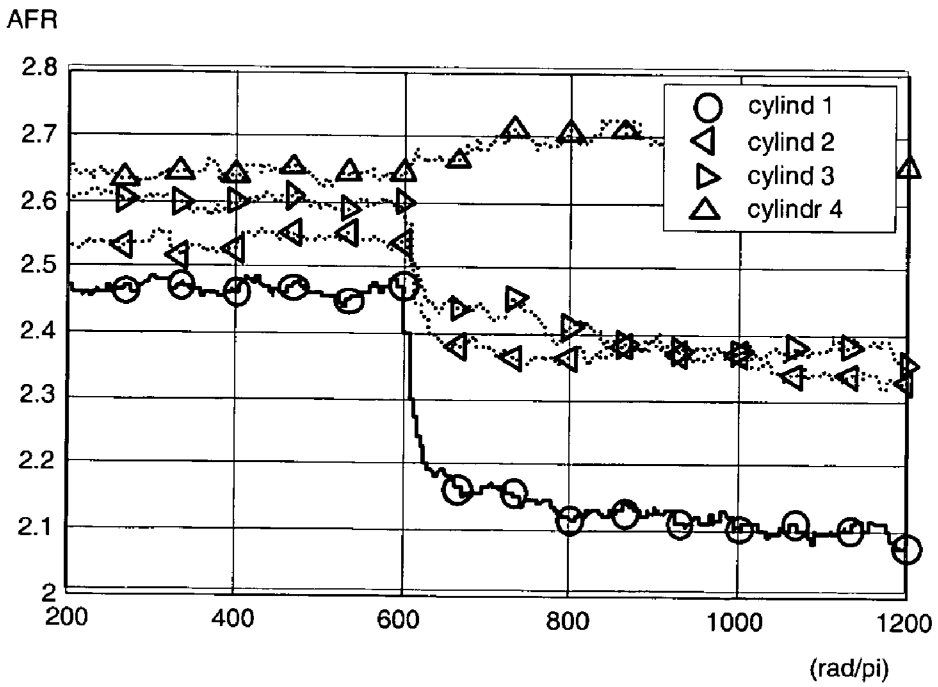
Figure 12A:
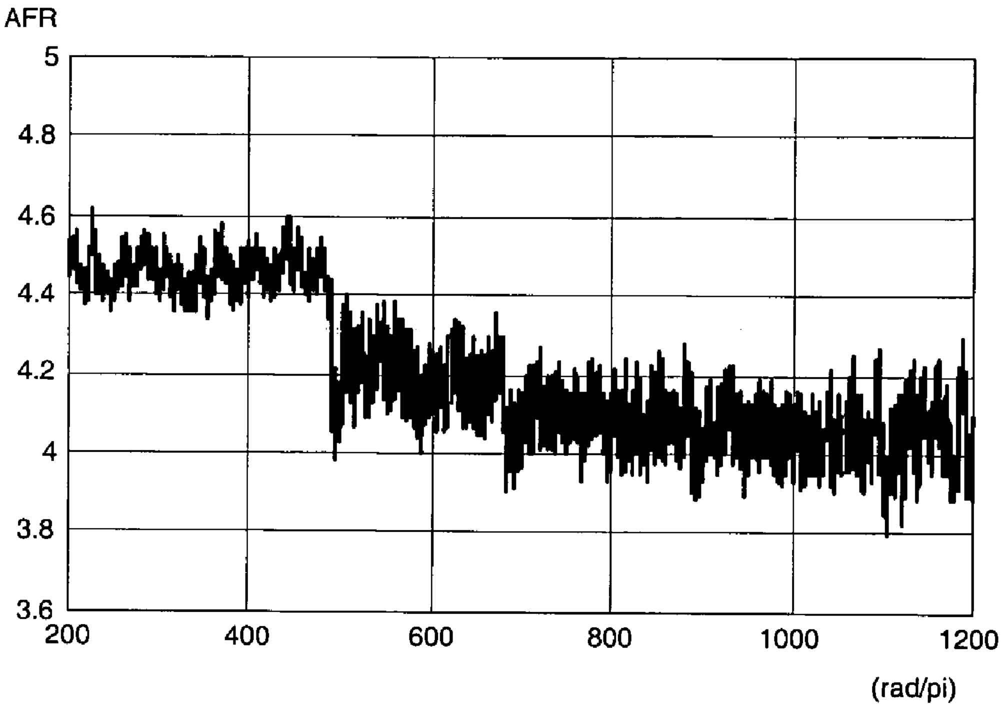
Figure 12B:
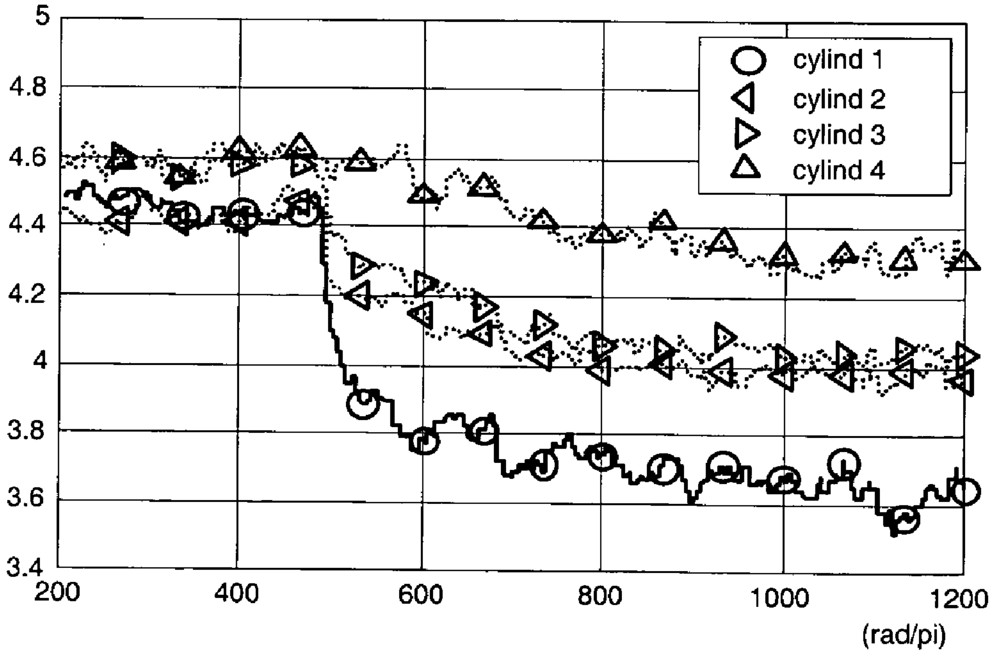

FIGS. 11_a_, 11_b_ and 12_a_, 12_b_ illustrate the measurement of the fuel/air ratio downstream from the turbine and the estimated fuel/air ratios, respectively for a working point at 2600 rpm at medium load and for a working point of 1500 rpm at low load.

The present invention relates to the construction of a state observer allowing, from the probe fuel/air ratio measurement and the information on the total gas mass inside the manifold given by the physical model, to estimate the air flow rates and the total flow rates at the outlet of the four cylinders, thus the fuel/air ratio equivalent to the four flow rates. The Extended Kalman Filter thus achieved is efficient and, above all, it requires no additional adjustment in case of a working point change. No identification stage is necessary, a measurement noise and model adjustment just has to be performed, only once.

Then, processing of the fuel/air ratio obtained by means of another Kalman filter allows to separate the flow rates and to identify the fuel/air ratios of each cylinder. The results obtained are relatively good at low speed and at higher speeds, once the lag time adjusted.

In order to make the estimator according to the invention more robust, whatever the working conditions, a lag time controller is used in parallel with the estimator, allowing to re-adjust the lag time after an injection time increment on a cylinder. This allows optimum calibration of the estimator, for example before a fuel/air ratio 1 phase.

The invention claimed is:

1. A method of estimating a fuel/air ratio in each cylinder of a multicylinder internal-combustion engine comprising an exhaust circuit including at least pipes connecting exhaust of the cylinders to a manifold and a fuel/air ratio detector downstream from the manifold comprising—:

providing a real time physical model representing expulsion of gases from the cylinders and the travel thereof in the exhaust circuit to the detector;

coupling the model with a non-linear state observer of an extended Kalman filter type wherein a fuel/air ratio measurement provided by the detector is taken into account by the non-linear state observer; and deducing a fuel/air ratio value at an inlet of the exhaust circuit.

2. A method as claimed in claim 1, wherein the fuel/air ratio value at the inlet of the exhaust circuit is assigned to an identified cylinder.

3. A method as claimed in claim 2, wherein a lag time due to the gas transit time and to a response time of the detector is evaluated by carrying out a test disturbance in the identified cylinder and by measuring an effect of the distinctions at the detector.

4. An application of the method as claimed in claim 3, to an engine control for adapting fuel mass injected into each cylinder for adjusting the fuel/air ratios in all the cylinders.

5. A method as claimed in claim 4 wherein only physical phenomena of gas composition dynamics are represented by the real time physical model.

6. A method as claimed in claim 3 wherein only physical phenomena of gas composition dynamics are represented by the real time physical model.

7. An application of the method as claimed in claim 2, to an engine control for adapting fuel mass injected into each cylinder for adjusting the fuel/air ratios in all the cylinders.

8. A method as claimed in claim 7 wherein only physical phenomena of gas composition dynamics are represented by the real time physical model.

9. A method as claimed in claim 2 wherein only physical phenomena of gas composition dynamics are represented by the real time physical model.

10. A method as claimed in claim 1, wherein the physical model is validated by means of a non-invertible reference modelling.

11. An application of the method as claimed in claim 10, to an engine control for adapting fuel masses injected into each cylinder adjusting the fuel/air ratios in all the cylinders.

12. A method as claimed in claim 11 wherein only physical phenomena of gas composition dynamics are represented by the real time physical model.

13. A method as claimed in claim 10 wherein only physical phenomena of gas composition dynamics are represented by the real time physical model.

14. An application of the method as claimed in claim 1, to an engine control for adapting fuel mass injected into each cylinder for adjusting the fuel/air ratios in all the cylinders.

15. A method as claimed in claim 14 wherein only physical phenomena of gas composition dynamics are represented by the real time physical model.

16. A method as claimed in claim 1 wherein only physical phenomena of gas composition dynamics are represented by the real time physical model.

* * * * *